No. 841,469. PATENTED JAN. 15, 1907.
W. V. TURNER.
PRESSURE CONTROLLING VALVE FOR AIR BRAKE SYSTEMS.
APPLICATION FILED JULY 6, 1903. RENEWED MAR. 31, 1906.
2 SHEETS—SHEET 1.
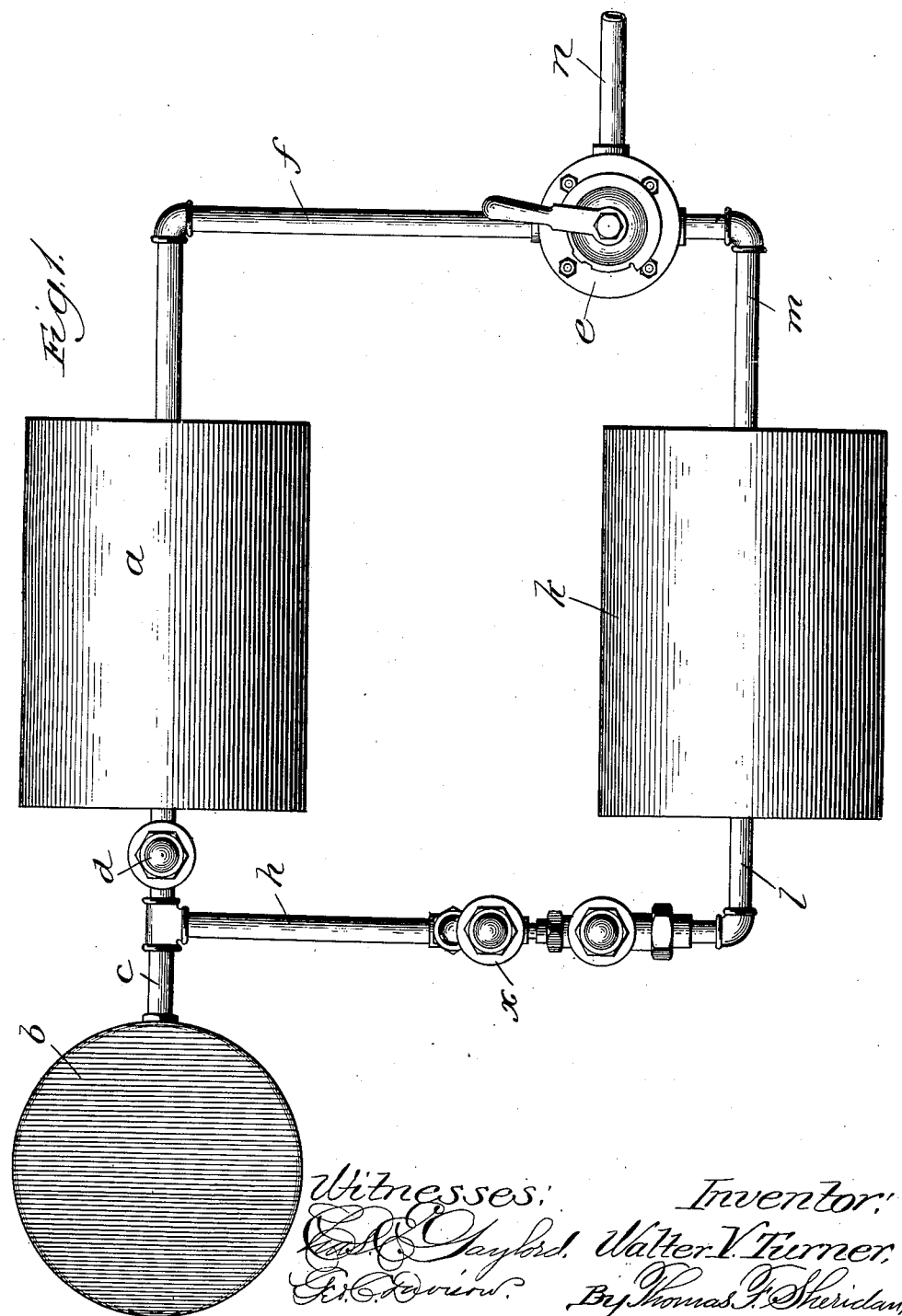

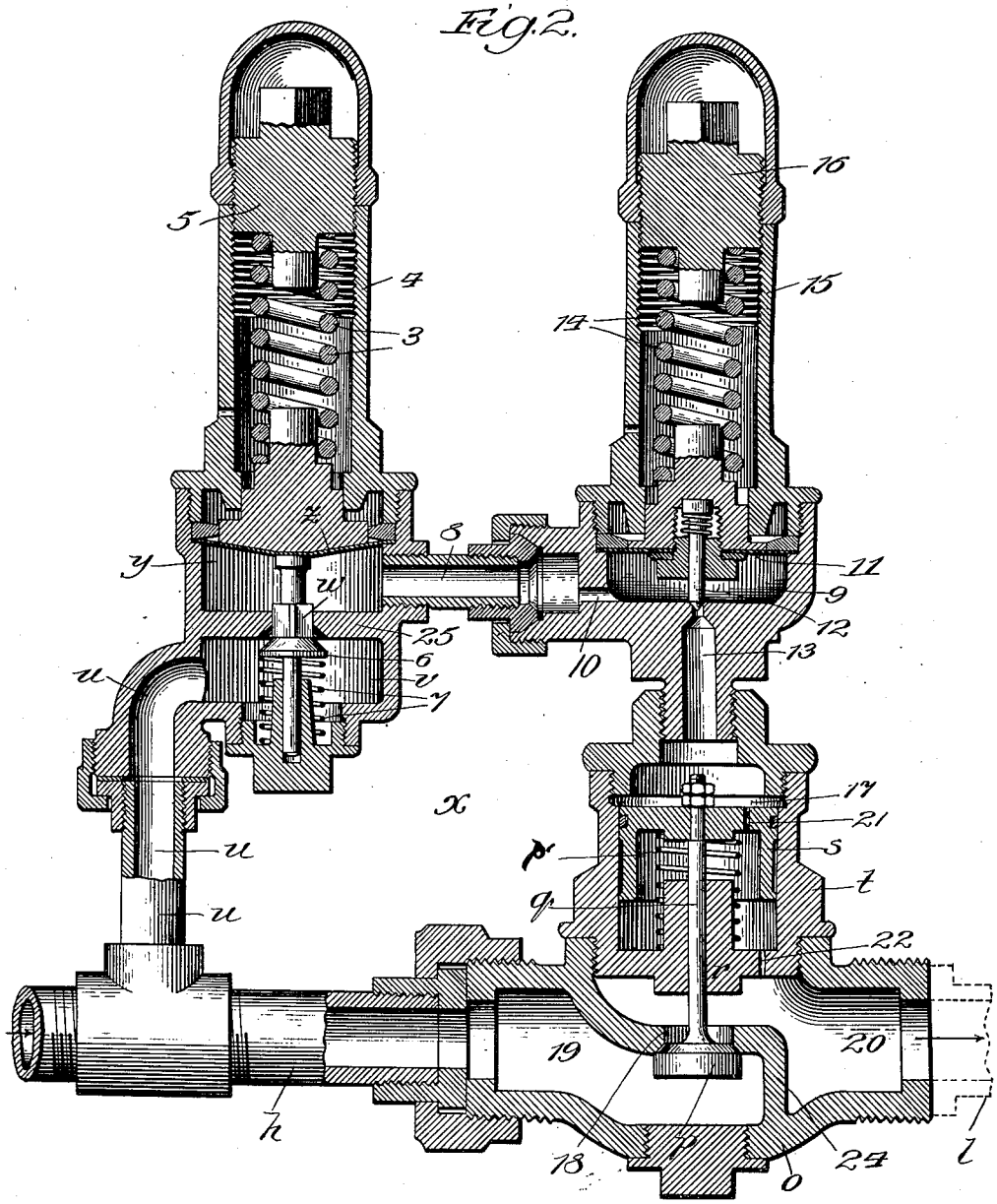

UNITED STATES PATENT OFFICE.

WALTER V. TURNER, OF WILMERDING, PENNSYLVANIA, ASSIGNOR, BY DIRECT AND MESNE ASSIGNMENTS, TO THE WESTINGHOUSE AIR BRAKE COMPANY, OF PITTSBURG, PENNSYLVANIA, A CORPORATION OF PENNSYLVANIA.

PRESSURE-CONTROLLING VALVE FOR AIR-BRAKE SYSTEMS.

No. 841,469.        Specification of Letters Patent.        Patented Jan. 15, 1907.

Application filed July 6, 1903. Renewed March 31, 1906. Serial No. 309,052.

*To all whom it may concern:*

Be it known that I, WALTER V. TURNER, a citizen of the United States, residing at Wilmerding, in the county of Allegheny and State of Pennsylvania, have invented certain new and useful Improvements in Pressure-Controlling Valves for Air-Brake Systems, of which the following is a specification.

The invention relates to pressure controlling valves, and has for its objects; to provide an improved valve of this character whereby the pressure on the receiving side of the valve is accurately controlled and limited to a certain predetermined amount; to provide a valve in which provision is made to prevent any backflow from the receiving to the supply side of the valve in case the pressure in the supply pipe falls below a fixed point; to provide a valve which not only controls the pressure on the receiving side of the valve, but also prevents any flow to such receiving side until a certain predetermined pressure has been obtained in the main reservoir of the system.

The preferred form of my invention is shown in the accompanying drawings, wherein—

Figure 1 is a plan view in diagram of a preferred arrangement of system in which this controlling valve may be employed, and Figure 2 an enlarged sectional elevation of a fluid pressure controlling valve constructed in accordance with these improvements.

In the preferred form of system in which I desire to use this improved controlling valve (see Figure 1) I provide a main reservoir $a$, connected with an air pump $b$ by means of a pipe $c$ in which an "excess pressure" valve $d$ is employed. This excess pressure valve is of any usual type of construction that permits air to enter the main reservoir up to certain pressures and cuts it off above the same. This main reservoir is connected with an engineer's brake valve $e$, of the usual construction, by means of a pipe $f$. A supply reservoir $k$ is provided for the train line and connected with the air pump by means of pipes $c$, $h$ and $l$, and with the engineer's brake valve by means of a pipe $m$, such brake valve being connected with the train by means of a pipe $n$. In this system the main reservoir takes air under pressure up to about ninety pounds, when the excess pressure valve $d$ cuts off all pressure in excess of the same. From the arrangement of the parts in this system, it will be seen that unless some means be interposed between the air pump and supply reservoir, such reservoir would take any pressure which the pump might develop or which might be contained in any of the other reservoirs. It becomes necessary, therefore, to prevent such a contingency and to maintain the desired pressure, say seventy pounds to the square inch. To this end this invention is designed, and to accomplish it a controlling valve $x$ is inserted in the system, as shown in Figure 1.

Describing in detail the controlling valve which forms the subject-matter of this invention and which is shown in enlarged view in Figure 2, a main valve body $o$ is provided and inserted in the supply pipe between the parts $h$ and $l$ thereof. This main valve body is provided with a partition 24 dividing it into two chambers 19 and 20, and having an opening 18. A valve $p$ is seated in the opening 18 therein. In order to operate this main valve, its stem $q$ is extended upwardly through a cap portion $r$ and attached to a piston $s$ operating in a cylinder $t$ in said cap. The head of this piston is provided with the small throttling opening 21, and the bottom of the cap $r$ is also provided with an opening 22. These openings constitute equalizing means which allow the equalization of pressure between the two sides of the piston and between the cylinder and the chamber 20. A by-pass connection between the chambers 19 and 20 is provided in the pipe $u$, chambers $v$ and $y$, pipe 8, passage 10, chamber 9, passage 13, cylinder $t$ and the throttling openings 21 and 22. Two valves are provided in this by-pass for automatically controlling the passage of air for operating the piston $s$ and the main valve $p$ which it controls. The valve $p$ is normally held closed by the spring $p'$, and is only opened for the passage of air from the chamber 19 to the receiving chamber 20, when air pressure is admitted above the cylinder $s$ to depress it. The first valve $w$ in the by-pass is controlled by the diaphragm Z and by the spring 3 which normally keeps the valve w open. The spring 3 is provided with an adjusting nut 5 adjustable in the cap 4, and the tension of the spring may be adjusted to suit the requirements. If the pressure to be maintained in the supply reservoir is seventy pounds, the spring 3 is preferably adjusted so that the diaphragm Z will operate it when the pressure in the chamber y is seventy pounds. In order to make the valve w follow the diaphragm as it rises, the light spring 7 is used. The second valve 12 in the by-pass, which is a needle valve, is controlled by the diaphragm 11 and the spring 14, which latter normally holds the valve in closed position. This spring is provided with a regulating nut 16, and the pressure at which the spring is adjusted to operate is slightly less than the pressure at which the spring 3 is adjusted to operate. When the spring 3 is set to operate at a seventy pound pressure, the spring 14 should operate at about sixty pounds. It will be seen from this arrangement of spring tensions and reversely operating diaphragm valves that the valves w and 12 will never be closed at the same time, as when the pressure in the chamber y is sufficient to close the valve w, such pressure in the chamber 9 will be sufficient to open the valve 12.

The operation of the device is as follows: Assuming that there is no pressure in either the chamber 19 or chamber 20, the parts of the valve will all be in the position shown in Figure 2, with the exception that the needle valve 12 will be closed by the spring 14. If now pressure is produced in the pipe h by means of the air pump, there will be no flow of air from the chamber 19 to the chamber 20 through the valve opening 18, as such valve is normally held shut by the spring p', and furthermore, there will be no flow of air through the by-pass, for the reason that the needle valve 12 is closed. The parts will maintain their positions until the pressure in the pipe h reaches sixty pounds at which time the pressure in the by-pass will be sixty pounds, and, as the spring 14 is set to work at this pressure, the valve 12 will open, thus permitting a passage of air down into the piston cylinder, thereby lowering the piston and opening the valve p. The flow of air now continues through the valve opening 18, and the by-pass, until the pressure attained in the chambers 19 and 20 is about seventy pounds, at which time the pressure in the chamber y is sufficient to raise the diaphragm Z against the pressure of the spring 3, and thereby close the valve w. As there is now no flow of air through the passage 13, and through the piston, the openings 21 and 22 permit of equalization of pressures on the two sides of the piston, and the spring p' closes the valve p. The operation when the pressure in the supply reservoir and part 20 falls, and the valve p must be opened to replenish the pressure, is as follows. The pressure in the by-pass and chamber y being the same as in the pipe l, the pressure of the spring 3 will not open the valve w until the pressure drops to seventy pounds, at which time the valve w opens and the air from the pipe h passes through such valve, the pipe 8, chamber 9, passage 13 and cylinder t operating the piston s and opening the valve p. The operation whereby the valve p is closed is now repeated, and is the same as that previously described for this operation.

It will be apparent from the foregoing that the applicant has provided a valve which will accurately control the air pressure in the supply reservoir, and will prevent such pressure from rising above any predetermined amount. It will also be seen that the provision of the needle valve 12 serves to keep the by-pass closed before the pressure reaches sixty pounds, and prevents any operation of the valve by lower pressure, thereby assuring a pressure of sixty pounds in the main reservoir before any pressure is supplied to the supply reservoir, which condition is necessary to the proper operation of the system, as will be apparent to those skilled in the art. This valve also tends to prevent a backflow of pressure through the by-pass in case the pressure in the pipe h falls below that in the pipe l. This of course only applies to a certain extent, for the reason that for any marked difference in pressure between the chambers 19 and 20, the valve p would be reciprocated downwardly by a relatively great pressure in the chamber 20. Within certain limits, however, the spring p' will keep this valve closed, and there will be no chance of backflow through the system.

Having thus described my invention and illustrated its use, what I claim as new, and desire to secure by Letters Patent, is the following:

1. In a fluid pressure controlling valve for air brake systems, the combination of a main valve for opening and closing a passage through the supply pipe leading to the supply reservoir, a piston attached to and operating the same, a supplementary diaphragm valve for opening and closing a by-passage leading from the supply pipe to the chamber in which said piston operates, and a main diaphragm valve for opening and closing the by-passage between the supply pipe and said supplementary diaphragm valve chamber, substantially as described.

2. In a fluid pressure controlling valve for air brake systems, the combination of a main valve for opening and closing a passage through the supply pipe leading to the supply reservoir, a piston of greater superficial area attached to and operating said valve, a supplementary diaphragm valve operating in a chamber connected with the chamber in which the said piston operates and opening and closing communication between the same, and a main diaphragm valve for opening and closing communication between the supply pipe and the chamber of the supplementary diaphragm valve, substantially as described.

3. In a fluid pressure controlling valve for air brake systems, the combination of a main valve body provided with a perforated partition forming chambers on each side of the same and connected with the supply pipe which leads to the supply reservoir, a valve in said perforation for opening and closing the same and thereby the main supply passage, a cap attached to said valve body provided with a cylinder, a piston operating in said cylinder and connected with the main valve for operating the same, a supplementary diaphragm valve operating in a chamber having communication with the cylinder above the operating piston and opening and closing communication between the same, a by-pipe or passage leading from the main supply-pipe to the supplementary diaphragm valve chamber, and a main diaphragm valve in such by-passage for opening and closing the same, substantially as described.

4. In a fluid pressure controlling valve for air brake systems, the combination of a main valve body provided with a perforated partition dividing the same into two chambers connected with the main supply passage leading to a supply reservoir, a valve seated in such perforation for opening and closing the same, a cylindrical cap provided with an equalizing perforation forming a closure for said valve body, a piston of greater superficial area than the main valve and connected therewith so as to operate the same and provided with an equalizing - perforation extending therethrough, a supplementary diaphragm valve body attached to said valve-cap and provided with a chamber and passage communicating with the chamber in the cylinder above the movable piston, a supplementary diaphragm valve therein for opening and closing communication between the above named chambers, a tension spring for operating said diaphragm in one direction, means for placing said spring under tension, a by-pipe or passage leading from the main supply pipe to the chamber of the supplementary diaphragm valve, a main diaphragm valve for opening and closing said by-passage, a tension spring for operating said main diaphragm valve in one direction, and means for placing such spring under tension, substantially as described.

5. In a fluid pressure controlling valve for air brake systems, the combination of a main valve body provided with a perforated dividing partition, a main valve seated in such perforation for opening and closing the same and thereby the main supply passage leading to a supply reservoir, a cap or closure for said valve body providing a cylindrical chamber having an equalizing passage connecting it with the chamber of the main valve body on the supply reservoir side, a piston in said cylinder chamber connected with the main valve for operating the same and provided with an equalizing passage connecting the cylinder chamber above and below said piston, a supplementary diaphragm valve body connected with the cap or closure of the main valve body and provided with a valve chamber and passage connecting it with the cylinder chamber above the movable piston, a supplementary diaphragam valve for opening and closing the last named passage, a tension spring for operating said valve in one direction, a by-pipe or passage connecting the supply pipe with the supplementary diaphragm valve chamber, a main diaphragm valve body provided with a partition dividing it into two chambers—a diaphragm chamber $y$ and a valve chamber $v$ having a perforation connecting the same, a diaphragm $z$ provided with a valve 6 for opening and closing said perforation and thereby the by-passage, and tension spring mechanism for operating said diaphragm in one direction, substantially as described.

6. In combination, a supply pipe, a valve therein, a bypass about the valve, a controlling piston for the valve located in the by-pass, a pair of valves in the by-pass, and a controlling diaphragm and spring for each valve, the spring and diaphragms being so arranged that one valve is spring-held open and the other spring held shut.

7. In combination, a supply pipe, a valve therein, a by-pass about the valve, a controlling piston for the valve located in the by-pass, a valve in the by-pass normally spring-held open, a controlling diaphragm therefor adapted to be acted upon by the air to close the valve when the desired pressure is obtained.

8. In combination, a supply pipe, a valve therein, a by-pass about the valve, a controlling piston for the valve located in the by-pass provided with spring means for normally holding it closed, and with a throttling passage, a valve in the by-pass normally spring-held open, and a controlling diaphragm therefor adapted to be acted upon by the air to close the valve when the desired pressure is obtained.

9. In combination, a supply pipe, a valve therein, a by-pass about the valve, a controlling piston for the valve located in the by-pass provided with spring means for normally holding it closed, and with a throttling passage, a valve in the by-pass normally spring-held open, a controlling diaphragm therefor adapted to be acted upon by the air to close the valve when the desired pressure is obtained, and a second valve in the by-pass provided with spring means for normally keeping it closed, and a controlling diaphragm therefor adapted to be acted upon by the air to open the valve.

10. In combination, a supply pipe, a valve therein, a by-pass about the valve, a controlling piston for the valve located in the by-pass provided with spring means for normally holding it closed, and with a throttling passage, a valve in the by-pass normally spring-held open, a controlling diaphragm therefor adapted to be acted upon by the air to close the valve when the desired pressure is obtained, and a second valve in the by pass provided with spring means for normally keeping it closed, and a controlling diaphragm therefor adapted to be acted upon by air to open the valve, the springs for the two diaphragms being so adjusted that the pressure necessary to close the first by-pass valve is greater than that necessary to open the second by-pass valve.

11. In combination, a pipe comprising a supply section and a receiving section, means for supplying fluid pressure to the supply section, and governing means between the two sections comprising a means controlled by pressure from the supply section for preventing a flow of fluid from one section to the other until a predetermined pressure is obtained in the supply section, and an independent means controlled from the receiving section for cutting off the flow of pressure when a predetermined pressure is attained in such receiving section.

12. In combination, a supply pipe, a main valve therefor provided with means for normally closing it, a by-pass about the valve, a piston in the by-pass for opening the valve, a small connecting opening between the sides of the piston, and means in the by-pass for automatically preventing a back flow through the by-pass, and other means for automatically operating the piston to open the main valve when the pressure falls below a predetermined amount on the receiving side of such main valve.

13. In combination in a pipe, a supply section and a receiving section, a connecting passage therebetween, and a pair of controlling valves therein each having an operating fluid pressure abutment and one valve being spring held open and the other spring held shut.

WALTER V. TURNER.

Witnesses:
HARRY IRWIN CROMER,
ROBERT H. WILES.